US012365353B2

(12) United States Patent
Sung et al.

(10) Patent No.: US 12,365,353 B2
(45) Date of Patent: Jul. 22, 2025

(54) APPARATUS AND METHOD FOR ADAPTIVE AUTONOMOUS DRIVING CONTROL

(71) Applicant: ELECTRONICS AND TELECOMMUNICATIONS RESEARCH INSTITUTE, Daejeon (KR)

(72) Inventors: Kyung-Bok Sung, Daejeon (KR); Do-Wook Kang, Daejeon (KR); Kyoung-Wook Min, Daejeon (KR); Jeong-Woo Lee, Daejeon (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 278 days.

(21) Appl. No.: 17/979,238

(22) Filed: Nov. 2, 2022

(65) Prior Publication Data

US 2023/0133329 A1    May 4, 2023

(30) Foreign Application Priority Data

Nov. 3, 2021    (KR) .................... 10-2021-0149557

(51) Int. Cl.
*B60W 50/06* (2006.01)
*B60W 60/00* (2020.01)
(Continued)

(52) U.S. Cl.
CPC .......... *B60W 50/06* (2013.01); *B60W 60/001* (2020.02); *B60W 2050/0075* (2013.01);
(Continued)

(58) Field of Classification Search
None
See application file for complete search history.

(56) References Cited

U.S. PATENT DOCUMENTS

2012/0109458 A1*  5/2012  Sidlosky ............ B60T 8/17551
                                                          701/41
2012/0123614 A1   5/2012  Laws et al.
                   (Continued)

FOREIGN PATENT DOCUMENTS

KR        10-1491622        2/2015
KR     10-2018-0044786      5/2018
                   (Continued)

*Primary Examiner* — Aniss Chad
*Assistant Examiner* — Madison R. Inserra
(74) *Attorney, Agent, or Firm* — KILE PARK REED & HOUTTEMAN PLLC

(57) ABSTRACT

Disclosed herein are an apparatus and method for adaptive autonomous driving control. The apparatus includes memory in which at least one program is recorded and a processor for executing the program. The program may perform control of a target vehicle by converting a theoretical control value based on a vehicle control algorithm into a hardware-dependent control value, which is dependent on the platform or hardware of the target vehicle, and may modify at least one parameter or a conversion equation for conversion of the hardware-dependent control value such that an error is minimized based on the difference between a response value according to the control of the target vehicle and a control value.

16 Claims, 5 Drawing Sheets

(51) Int. Cl.
 *B60W 40/10* (2012.01)
 *B60W 50/00* (2006.01)
 *G06N 3/08* (2023.01)

(52) U.S. Cl.
 CPC ... *B60W 2510/20* (2013.01); *B60W 2520/105* (2013.01); *B60W 2530/201* (2020.02); *B60W 2540/10* (2013.01); *B60W 2540/12* (2013.01)

(56) References Cited

U.S. PATENT DOCUMENTS

| | | |
|---|---|---|
| 2015/0234382 A1 | 8/2015 | Ju et al. |
| 2020/0207412 A1 | 7/2020 | Al Assad et al. |
| 2021/0116907 A1* | 4/2021 | Altman ............. B60W 60/0015 |

FOREIGN PATENT DOCUMENTS

| | | |
|---|---|---|
| KR | 10-2020-0075918 | 6/2020 |
| KR | 10-2021-0013130 | 2/2021 |
| KR | 10-2224693 | 3/2021 |
| WO | 2018/215910 | 11/2018 |
| WO | 2019/180700 | 9/2019 |
| WO | 2020/160778 | 8/2020 |

* cited by examiner

APPARATUS AND METHOD FOR ADAPTIVE AUTONOMOUS DRIVING CONTROL

CROSS REFERENCE TO RELATED APPLICATION

This application claims the benefit of Korean Patent Application No. 10-2021-0149557, filed Nov. 3, 2021, which is hereby incorporated by reference in its entirety into this application.

BACKGROUND OF THE INVENTION

1. Technical Field

The disclosed embodiment relates to autonomous driving control technology applicable to various platforms and various types of hardware using the same algorithm in autonomous driving vehicles and autonomous mobile robot systems.

2. Description of the Related Art

Currently, autonomous driving vehicles and autonomous mobile robots are being actively researched, and some of these are released as real products. However, as platforms diversify and as types of autonomous driving vehicles increase, different algorithms are used for individual platforms or individual types of hardware, or even when the same algorithm is used, the algorithm is required to be optimized depending on the hardware.

For example, when various kinds of platforms for autonomous driving of sedans, vans, buses, and the like are present or when different types of hardware are used in the same platform, it is necessary to apply different algorithms to the respective types of hardware, or even when the same algorithm is used, it is necessary to tune individual parameters in order to achieve the optimal performance for safety or the like. Here, when only a small number of target vehicles is present, parameters may be adjusted for the individual vehicles, but when there are hundreds or thousands of target vehicles, it is difficult for a person to manually adjust and manage the same.

SUMMARY OF THE INVENTION

An object of the disclosed embodiment is to enable autonomous driving control to be performed depending on each of various types of platforms or individual types of hardware without a change in an algorithm.

An apparatus for adaptive autonomous driving control according to an embodiment includes memory in which at least one program is recorded and a processor for executing the program. The program may perform control of a target vehicle by converting a theoretical control value based on a vehicle control algorithm into a hardware-dependent control value, which is dependent on the platform or hardware of the target vehicle, and may modify at least one parameter or a conversion equation for conversion of the hardware-dependent control value such that an error is minimized based on the difference between a response value according to control of the target vehicle and a control value.

Here, the program may perform generating the theoretical control value based on a theoretical response value, converting the theoretical control value into a normalized control value that is independent of vehicle hardware, converting the normalized control value into the hardware-dependent control value corresponding to the target vehicle, performing actual control of the target vehicle using the hardware-dependent control value, checking a hardware-dependent response value according to the actual control of the target vehicle, generating a normalized response value based on the hardware-dependent response value, generating a theoretical response value based on the normalized response value, and modifying the at least one parameter or the conversion equation for conversion into the hardware-dependent control value such that an error is minimized based on the difference between at least one of the control values and a response value corresponding to the control value.

Here, the program may set the initial value of the theoretical response value to a value input by a user or a random value within a certain range.

Here, the at least one parameter or the conversion equation may include at least one of a wheelbase, an acceleration/deceleration response speed or delay, a steering ratio, an acceleration ratio based on a gas pedal value, or a deceleration ratio based on a brake pedal value, or a combination thereof.

Here, the program may perform checking the hardware-dependent response value after a predetermined time elapses since the actual control of the target vehicle is performed.

Here, the predetermined time may be set depending on hardware characteristics of the target vehicle.

Here, modifying the at least one parameter or the conversion equation may be performed based on an optimization scheme or a deep-learning scheme using an error cost function.

Here, control values according to time and response values corresponding to the respective control values may be constructed as a dataset for deep learning.

A method for adaptive autonomous driving control according to an embodiment may include performing control of a target vehicle by converting a theoretical control value based on a vehicle control algorithm into a hardware-dependent control value, which is dependent on the platform or hardware of the target vehicle, and modifying at least one parameter or a conversion equation for conversion of the hardware-dependent control value such that an error is minimized based on the difference between a response value according to control of the target vehicle and a control value.

Here, performing the control of the target vehicle may include generating the theoretical control value based on a theoretical response value, converting the theoretical control value into a normalized control value that is independent of vehicle hardware, converting the normalized control value into the hardware-dependent control value corresponding to the target vehicle, and performing actual control of the target vehicle using the hardware-dependent control value.

Here, modifying the at least one parameter or the conversion equation may include checking a hardware-dependent response value according to the actual control of the target vehicle, generating a normalized response value based on the hardware-dependent response value, generating a theoretical response value based on the normalized response value, and modifying the at least one parameter or the conversion equation for conversion into the hardware-dependent control value such that an error is minimized based on the difference between at least one of the control values and a response value corresponding to the control value.

Here, the initial value of the theoretical response value may be set to a value input by a user or a random value within a certain range.

Here, the at least one parameter or the conversion equation may include at least one of a wheelbase, an acceleration/deceleration response speed or delay, a steering ratio, an acceleration ratio based on a gas pedal value, or a deceleration ratio based on a brake pedal value, or a combination thereof.

Here, checking the hardware-dependent response value may be performed after a predetermined time elapses since the actual control of the target vehicle is performed.

Here, the predetermined time may be set depending on hardware characteristics of the target vehicle.

Here, modifying the at least one parameter or the conversion equation may be performed based on an optimization scheme or a deep-learning scheme using an error cost function.

Here, control values according to time and response values corresponding to the respective control values may be constructed as a dataset for deep learning.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
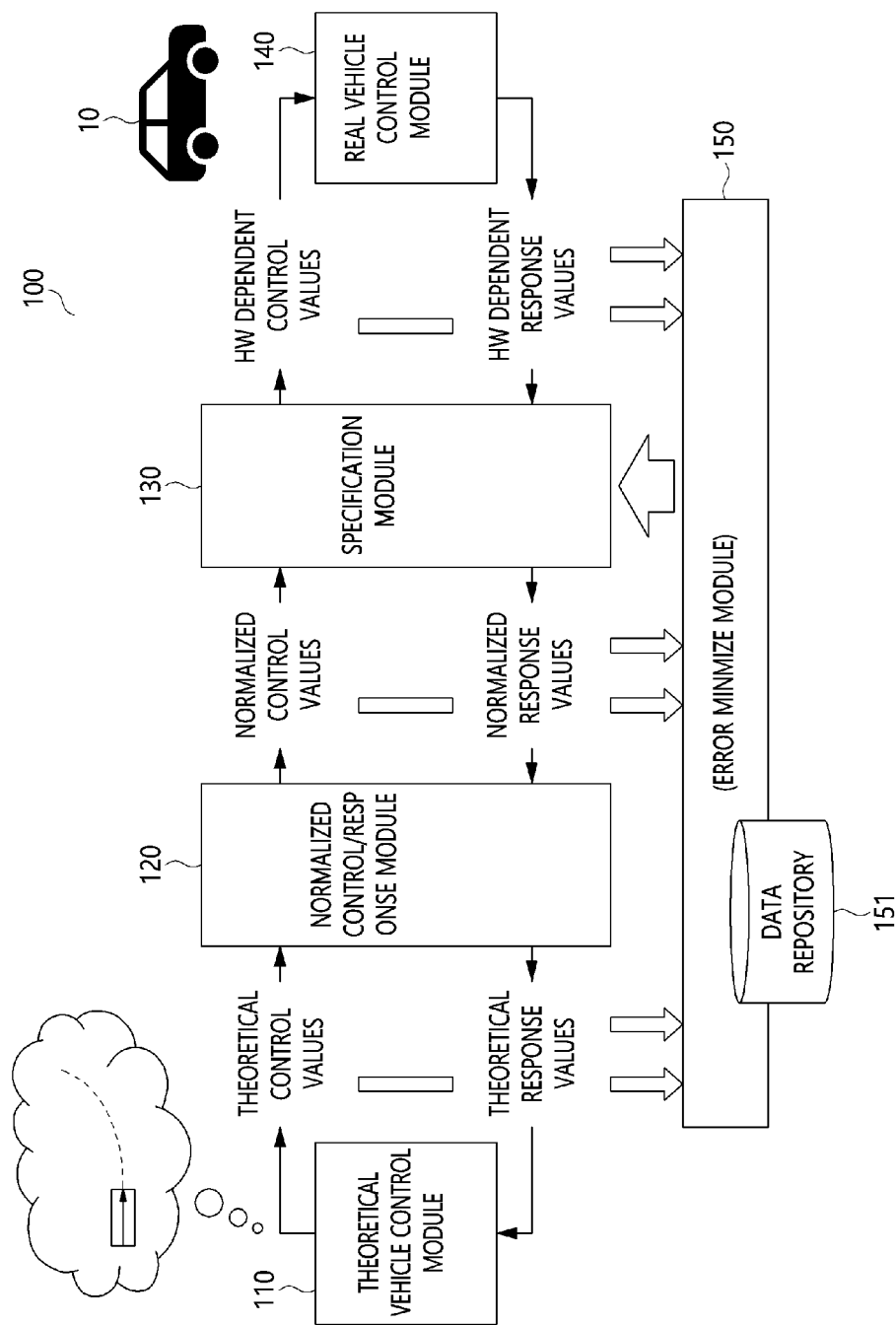
FIG. 1 is a schematic block diagram of an apparatus for adaptive autonomous driving control according to an embodiment.

The advantages and features of the present invention and methods of achieving them will be apparent from the following exemplary embodiments to be described in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for adaptive autonomous driving control according to an embodiment will be described in detail with reference to FIGS. 1 to 5.

The present invention proposes an apparatus and method for autonomous driving control applicable to various platforms and various types of hardware, which enable autonomous driving to be performed without a change in an algorithm depending on the platform or the hardware. In an embodiment, autonomous driving control for vehicles will be described in order to help understanding, but the targets of autonomous driving control are not limited to vehicles. The targets to which the embodiment is applied may encompass various autonomous driving devices, including vehicles, autonomous mobile robots, and the like.

FIG. 1 is a schematic block diagram of an apparatus for adaptive autonomous driving control according to an embodiment.

Referring to FIG. 1, the apparatus for adaptive autonomous driving control according to an embodiment includes a theoretical vehicle control module 110, a normalized control/response module 120, a hardware specification module 130, an error minimize module 150, and a real vehicle control module 140.

The theoretical vehicle control module 110 generates theoretical control values based on a vehicle control algorithm using theoretical response values output from the normalized control/response module 120. Here, because the theoretical response values are not present at the outset, it is necessary to set the initial values thereof. According to an embodiment, the initial values of the theoretical response values may be set to values input by a user or set to random values within a certain range.

The normalized control/response module 120 converts the theoretical control values generated by the theoretical vehicle control module 110 into normalized control values that are not dependent on any platform or hardware. Also, the normalized control/response module 120 converts the normalized response values output from the hardware specification module 130 into theoretical response values.

The hardware specification module 130 changes the normalized control values generated by the normalized control/response module 120 to hardware-dependent control values so as to be suitable for an individual type of hardware. Accordingly, individual platforms or individual types of hardware may be separated, and even though the same algorithm is used, the algorithm may be applied to various types of hardware. Also, the hardware specification module 130 converts the hardware-dependent response values output from the real vehicle control module 140 into normalized response values.

The real vehicle control module 140 actually controls a target vehicle 10 based on the normalized control value generated by the hardware specification module 130 and outputs hardware-dependent response values acquired after control of the target vehicle 10.

The error minimize module 150 optimizes the hardware specification module 130 such that an error is minimized based on the difference between at least one control value and at least one response value generated in each of the normalized control/response module 120, the hardware specification module 130, and the real vehicle control module 140.

Here, the control value may include at least one of a theoretical control value, a normalized control value, or a hardware-dependent control value, or a combination thereof. Also, the response value is a response value for each control value, and may include at least one of a theoretical response value, a normalized response value, or a hardware-dependent response value, or a combination thereof.

Here, the error minimize module 150 modifies at least one parameter or a conversion equation used by the hardware specification module 130 so as to minimize an error using an optimization scheme or deep-learning scheme using an error cost function.

Here, the error minimize module 150 may include a data repository 151 in order to apply a deep-learning scheme. That is, the data repository 151 may store a dataset for deep learning, which includes control values and response values according to time.

The hardware specification module 130 converts the normalized control values into control values dependent on the platform or hardware of the target vehicle using the optimal parameters or conversion equation suitable for the platform or hardware of the target vehicle.

Here, the parameters or the conversion equation may include a wheelbase, an acceleration/deceleration response speed or delay, a steering ratio (the ratio of the turn of a steering wheel to the turn of front wheels), an acceleration ratio depending on a gas pedal value, and a deceleration ratio depending on a brake pedal value.

In the conventional method, specific values applied to individual hardware are manually adjusted based on experience by a person, or are adjusted or tuned to have the mean value of data accumulated during a certain period of time. However, these values may be automatically tuned or adjusted according to an embodiment.

Meanwhile, in an embodiment, when there is no optimized value at the outset, the hardware specification module 130 may use preset initial values or random values within a certain range. In this case, a disadvantage in which the use of random values can make optimization impossible may be remedied.

Figure 2:
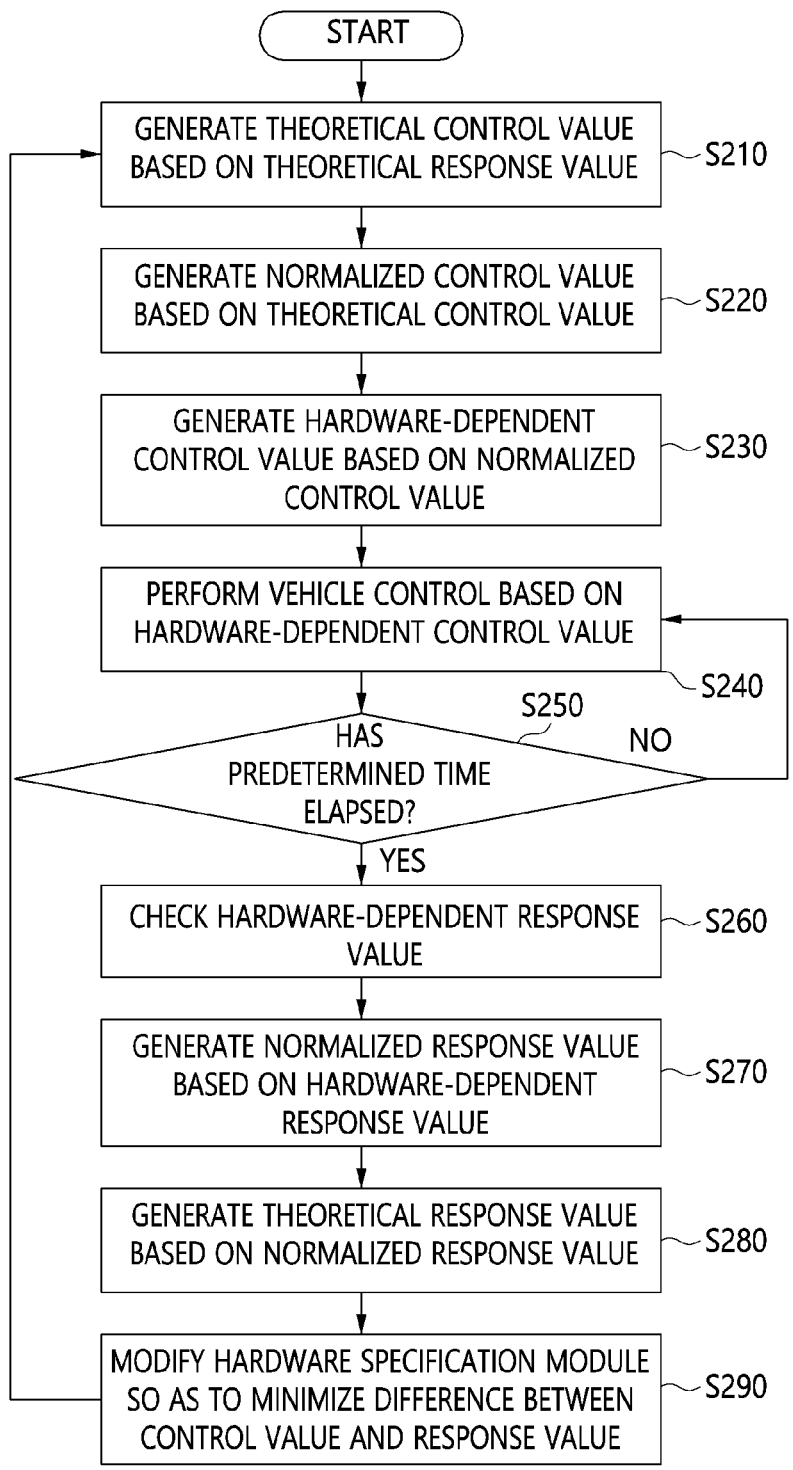
FIG. 2 is a flowchart for explaining a method for adaptive autonomous driving control according to an embodiment.
Figure 3:
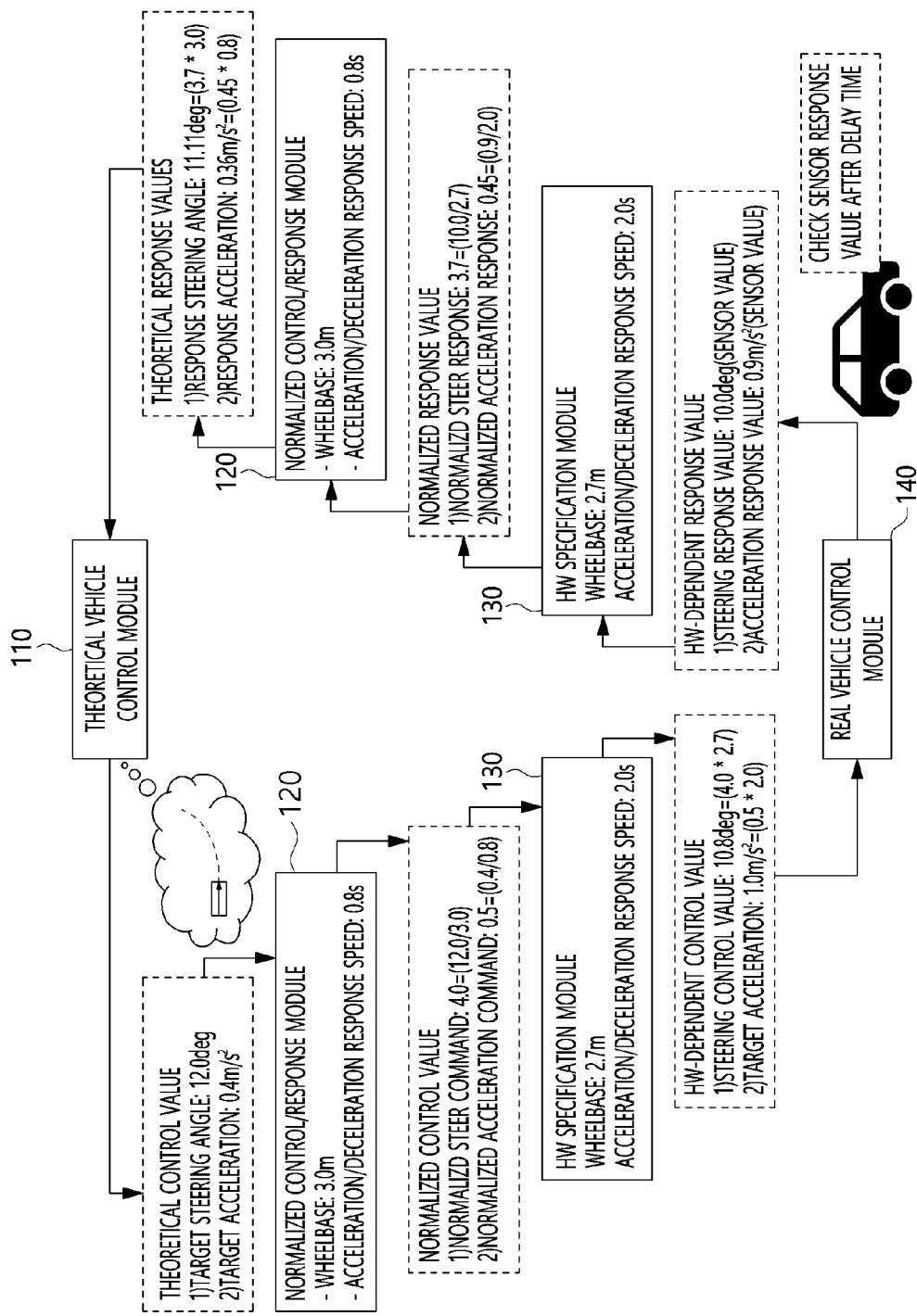
FIG. 3 and FIG. 4 are exemplary views for explaining a process for adaptive autonomous driving control according to an embodiment.
Figure 4:
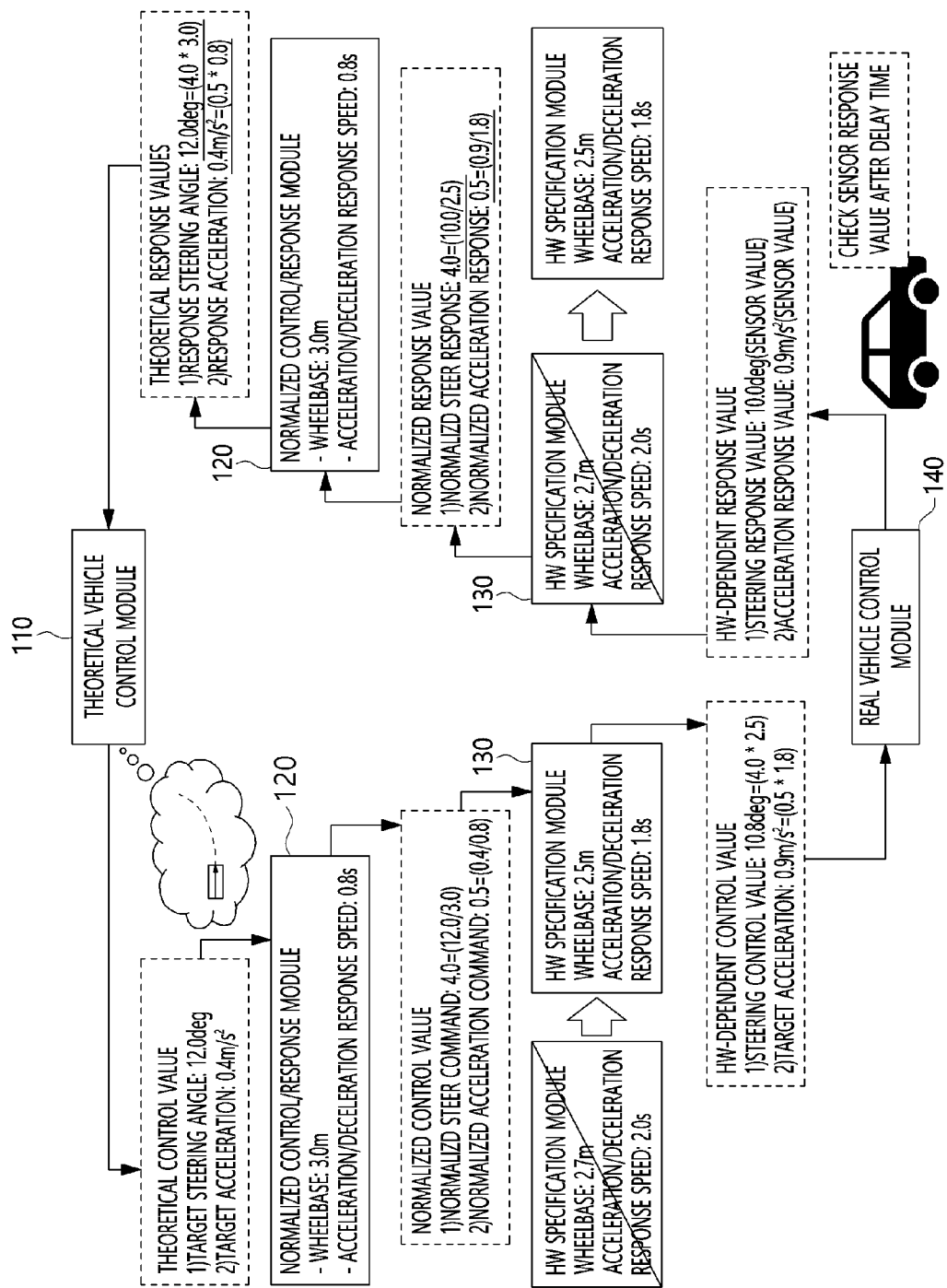

FIG. 2 is a flowchart for explaining a method for adaptive autonomous driving control according to an embodiment, and FIG. 3 and FIG. 4 are exemplary views for explaining a process of adaptive autonomous driving control according to an embodiment.

Referring to FIG. 1 and FIG. 2, the theoretical vehicle control module 110 generates theoretical control values based on theoretical response values at step S210. For example, referring to FIG. 3, a target steering angle set to 12.0 deg and target acceleration set to 0.4 m/s$^2$ may be generated as theoretical control values.

Here, because theoretical response values are not present at the outset, it is necessary to set the initial values thereof. According to an embodiment, the initial values of the theoretical response values may be set to values input by a user or random values within a certain range.

The normalized control/response module 120 converts the theoretical control values output from the theoretical vehicle control module 110 into normalized control values that are independent of vehicle hardware at step S220. For example, referring to FIG. 3, 'normalized steer command' may be converted into 4.0 as a normalized control value by dividing the target steering angle set to 12.0 deg, which is the theoretical control value, by a wheelbase that is set to 3.0 in the normalized control/response module 120, and 'normalized acceleration command' may be converted into 0.5 as a normalized control value by dividing the target acceleration set to 0.4 m/s$^2$, which is the theoretical control value, by an acceleration/deceleration response speed that is set to 0.8 in the normalized control/response module 120.

The hardware specification module 130 converts the normalized control values output from the normalized control/response module 120 into hardware-dependent control values corresponding to a target vehicle at step S230. For example, referring to FIG. 3, a steering control value is generated to have a value of 10.8 deg as a hardware-dependent control value by multiplying 'normalized steer command' set to 4.0, which is the normalized control value, by a wheelbase that is set to 2.7 m in the hardware specification module 130, and the target acceleration may be converted into 1.0 m/s$^2$ by multiplying 'normalized acceleration command' set to 0.5, which is the normalized control value, by the acceleration/deceleration response speed that is set to 2.0 s in the hardware specification module 130.

The real vehicle control module 140 performs actual control of the target vehicle using the hardware-dependent control values output from the hardware specification module 130 at step S240.

Subsequently, the real vehicle control module 140 checks hardware-dependent response values according to the actual control of the target vehicle and outputs the same at step S260. For example, referring to FIG. 3, a steering response value and an acceleration response value may be sensed as 10.0 deg and 0.9 m/s$^2$, respectively, as the hardware-dependent response values.

Here, the real vehicle control module 140 may check the hardware-dependent response values after a predetermined time has elapsed at step S250. This is because physical characteristics, in which an actual control command is performed and reflected after a certain time has elapsed since execution of the control command, are considered due to the characteristics of vehicles and transportation platforms.

Here, the predetermined time may vary depending on the characteristics of hardware, and may be managed by the hardware specification module 130. For example, the predetermined time may be set to a value ranging from 0.1 seconds to one second in general cars, but may be set to a value greater than that according to need. Here, the predetermined time may also be optimized by the error minimize module 150.

The hardware specification module 130 converts the hardware-dependent response values output from the real vehicle control module 140 into normalized response values at step S270. For example, referring to FIG. 3, 'normalized steer response' may be converted into 3.7 as a normalized response value by dividing the steering response value sensed as 10.0 deg, which is the hardware-dependent response value, by the wheelbase set to 2.7, and 'normalized acceleration response' may be converted into 0.45 as a normalized response value by dividing the acceleration response value sensed as 0.9 m/s$^2$, which is the hardware-dependent response value, by the acceleration/deceleration response speed set to 2.0.

The normalized control/response module 120 converts the normalized response values output from the hardware specification module 130 into theoretical response values at step S280. For example, referring to FIG. 3, a response steering angle may be generated to have a value of 11.11 deg as a theoretical response value by multiplying 'normalized steer response' set to 3.7 deg, which is the normalized response value, by the wheelbase set to 3.0, and a response acceleration may be converted into 0.36 m/s$^2$ as a theoretical response value by multiplying 'normalized acceleration response' set to 0.45, which is the normalized response value, by the acceleration/deceleration response speed set to 0.8. That is, the theoretical control values are set to 12.0 deg and 0.4 m/s$^2$ as the target steering angle and the target acceleration, but when the final theoretical response values are calculated based on the actual response values, the response steering angle and the response acceleration are calculated to be 11.11 deg and 0.36 m/s$^2$, respectively, and it can be seen that there is a difference between the target value and the response value. Accordingly, it can be seen that some parameters have errors, and these errors may be corrected by the error minimize module 150.

The error minimize module 150 modifies at least one parameter or a conversion equation for conversion of the control values of the hardware specification module 130 at step S290 so as to minimize the differences between the control values generated at steps S210 to S230 and the response values checked for the respective control values at steps S260 to S280, that is, the difference between at least one of the theoretical control value, the normalized control value, or the hardware-dependent control value, or a combination thereof and at least one of the theoretical response value, the normalized response value, or the hardware-dependent response value, or a combination thereof.

For example, referring to FIG. 4, the wheelbase value used in the hardware specification module 130 may be changed from 2.7 m to 2.5 m, and the acceleration/deceleration response speed used in the hardware specification module 130 may be changed from 2.0 s to 1.8 s. Accordingly, the hardware specification module 130 is modified, whereby the normalized response values and the theoretical response values may be modified. Accordingly, referring to FIG. 4, it can be seen that the theoretical control values match the theoretical response values and that the parameters for vehicle control are modified well.

The hardware specification module 130 is modified by repeatedly performing steps S210 to S290 described above, whereby the optimal hardware specification may be consistently set.

Figure 5:
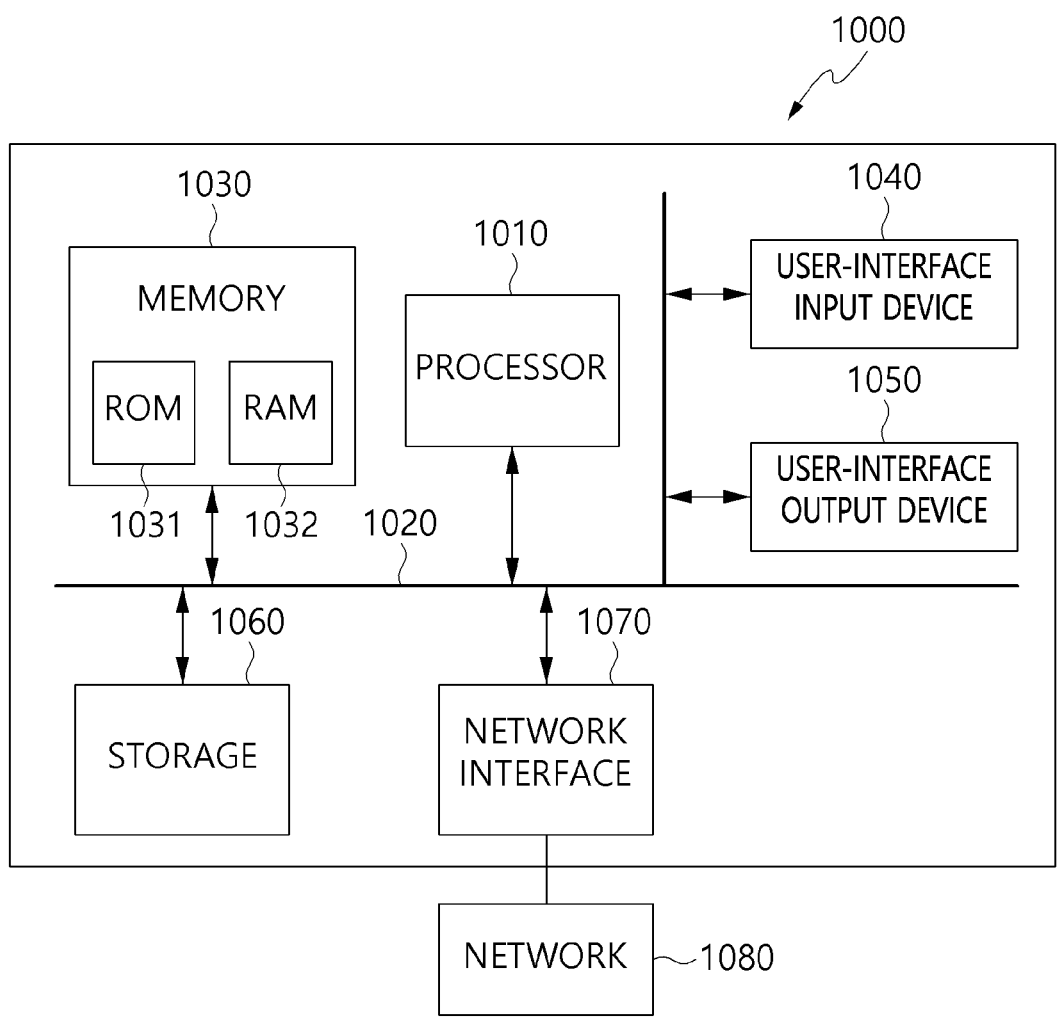
FIG. 5 is a view illustrating a computer system configuration according to an embodiment.

FIG. 5 is a view illustrating a computer system configuration according to an embodiment.

The apparatus 100 for adaptive autonomous driving control according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to an embodiment, there are advantages in that the same algorithm is used and the algorithm may be autonomously optimized depending on the characteristics of various types of hardware without manual adjustment. Accordingly, algorithm development may be separated from the actual operation of an autonomous driving system, and even though individual types of hardware have different degrees of responsiveness and different ratios, it is possible to respond thereto.

According to an embodiment, it is possible to autonomously respond to each type of hardware without the need to perform tuning therefor. Accordingly, the advantage may be maximized when this technology is applied to a large-scale service or a mass production system.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for adaptive autonomous driving control, comprising:
    memory in which at least one program is recorded; and
    a processor for executing the program,
    wherein the program is configured to
    perform control of a target vehicle by converting a theoretical control value based on a vehicle control algorithm into a hardware-dependent control value, which is dependent on a platform or hardware of the target vehicle, and
    modify at least one parameter or a conversion equation for conversion of the hardware-dependent control value such that an error is minimized based on a difference between a response value according to control of the target vehicle and a control value,
    wherein the program performs
    generating the theoretical control value based on an initial theoretical response value;
    converting the theoretical control value into a normalized control value that is independent of vehicle hardware;
    converting the normalized control value into the hardware-dependent control value corresponding to the target vehicle;
    performing actual control of the target vehicle using the hardware-dependent control value.

2. The apparatus of claim 1, wherein the program performs
    checking a hardware-dependent response value according to the actual control of the target vehicle;
    generating a normalized response value based on the hardware-dependent response value;
    generating a theoretical response value based on the normalized response value; and
    modifying the at least one parameter or the conversion equation for conversion into the hardware-dependent control value such that the error is minimized based on a difference between at least one control value and at least one response value corresponding to the at least one control value.

3. The apparatus of claim 2, wherein the program sets an initial value of the theoretical response value to a value input by a user or a random value within a certain range.

4. The apparatus of claim 2, wherein the at least one parameter or the conversion equation includes at least one of a wheelbase, an acceleration/deceleration response speed or delay, a steering ratio, an acceleration ratio based on a gas pedal value, or a deceleration ratio based on a brake pedal value, or a combination thereof.

5. The apparatus of claim 2, wherein the program performs checking the hardware-dependent response value after a predetermined time elapses since the actual control of the target vehicle is performed.

6. The apparatus of claim 5, wherein the predetermined time is set depending on hardware characteristics of the target vehicle.

7. The apparatus of claim 2, wherein modifying the at least one parameter or the conversion equation is performed based on an optimization scheme or a deep-learning scheme using an error cost function.

8. The apparatus of claim 7, wherein control values according to time and response values corresponding to the respective control values are constructed as a dataset for deep learning.

9. A method for adaptive autonomous driving control, comprising:
performing control of a target vehicle by converting a theoretical control value based on a vehicle control algorithm into a hardware-dependent control value, which is dependent on a platform or hardware of the target vehicle; and
modifying at least one parameter or a conversion equation for conversion of the hardware-dependent control value such that an error is minimized based on a difference between a response value according to control of the target vehicle,
wherein performing the control of the target vehicle includes:
generating the theoretical control value based on a initial theoretical response value;
converting the theoretical control value into a normalized control value that is independent of vehicle hardware;
converting the normalized control value into the hardware-dependent control value corresponding to the target vehicle; and
performing actual control of the target vehicle using the hardware-dependent control value.

10. The method of claim 9, wherein modifying the at least one parameter or the conversion equation includes:
checking a hardware-dependent response value according to the actual control of the target vehicle;
generating a normalized response value based on the hardware-dependent response value;
generating a theoretical response value based on the normalized response value; and
modifying the at least one parameter or the conversion equation for conversion into the hardware-dependent control value such that the error is minimized based on a difference between at least one control value and at least one response value corresponding to the at least one control value.

11. The method of claim 10, wherein an initial value of the theoretical response value is set to a value input by a user or a random value within a certain range.

12. The method of claim 10, wherein the at least one parameter or the conversion equation includes at least one of a wheelbase, an acceleration/deceleration response speed or delay, a steering ratio, an acceleration ratio based on a gas pedal value, or a deceleration ratio based on a brake pedal value, or a combination thereof.

13. The method of claim 10, wherein checking the hardware-dependent response value is performed after a predetermined time elapses since the actual control of the target vehicle is performed.

14. The method of claim 13, wherein the predetermined time is set depending on hardware characteristics of the target vehicle.

15. The method of claim 10, wherein modifying the at least one parameter or the conversion equation is performed based on an optimization scheme or a deep-learning scheme using an error cost function.

16. The method of claim 15, wherein control values according to time and response values corresponding to the respective control values are constructed as a dataset for deep learning.

* * * * *